INVENTOR
JACK H. B. HERTS
JOHN E. McPHEE
BY Liverance and Van Antwerp
ATTORNEYS

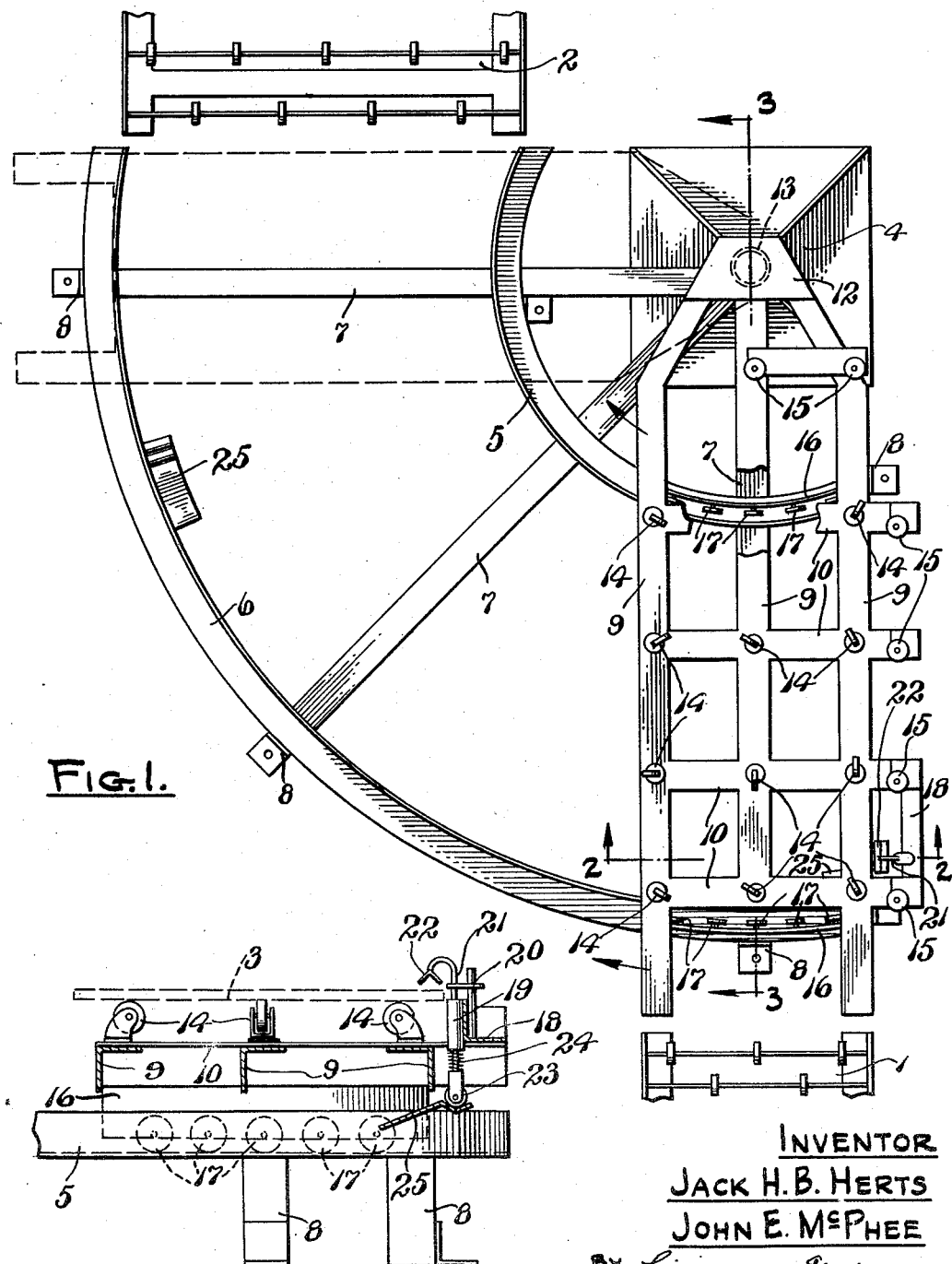

Patented Oct. 10, 1950

2,525,132

UNITED STATES PATENT OFFICE 2,525,132

CONVEYER DIRECTION CHANGER

Jack H. B. Herts and John E. McPhee, Grand Rapids, Mich., assignors to John Widdicomb Company, Grand Rapids, Mich., a corporation of Michigan Application January 17, 1949, Serial No. 71,314

5 Claims. (Cl. 198—33)

This invention is directed to and concerned with a novel and improved device for ready and easy changing the direction of movement of pallets, which are of rectangular form, longer than they are wide, from a conveyor over which they have been moved end to end, to another conveyor over which they are to be moved side by side. In such sidewise travel an economy is made of space and expense in supplying heat in conjunction with the process with which we use the pallets to carry products which have been finished thereon and varnished or otherwise coated, through a drying oven. If such pallets were to be moved through the drying oven lengthwise, with the manufactured articles thereon, there would be loss of space and greater heating expense. It is, of course to be understood that while in practice the invention has been used in conjunction with quick or forced drying of varnish or other finishings of articles which have a surface application of such finishes thereto, it is not to be restricted or limited to the one use mentioned.

It is an object and purpose of the present invention to provide a direction changer of the character specified in which the pellets are moved, one after the other in the direction of their length, on to the direction changer and swung preferably though not necessarily through an arc of 90° and delivered to a conveying means with the pallets located side by side, using a novel carriage for such pallets mounted on suitable tracks which carriage may successively receive the pallets which have been moved end to end, and swing them through such arc to deliver the pallets in a side by side location. A further object of the invention is to automatically clamp the pallets against aimless, accidental or other undesired movement during such change of direction, and automatically release the clamping means at each end of such movement so that a pallet may be received on the swinging carriage, clamped while it is being moved to its place of delivery, and automatically released when such delivery position is reached. Many other novel structures for the attainment of readily and easily handling the pallets and properly guiding them onto the carriage, and for readily and easily moving them off the carriage when the delivery position is reached, will appear and be understood from the following description, taken in connection with the accompanying drawings of a preferred practical structural embodiment of the invention, which is now in use, and in which drawings:

Fig. 1 is a plan view of the pallet direction changer made in accordance with our invention.

Fig. 2 is a somewhat enlarged fragmentary transverse vertical section substantially on the plane of line 2—2 of Fig. 1, looking in the direction indicated.

Like reference characters refer to like parts in the different figures of the drawings.

Figure 4:
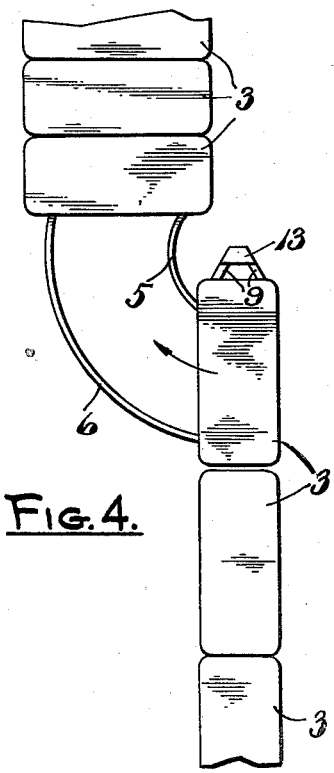
Figs. 4 and 5 are diagrammatic plans illustrating the movement of the pallet changer from one position to the other.
Figure 5:
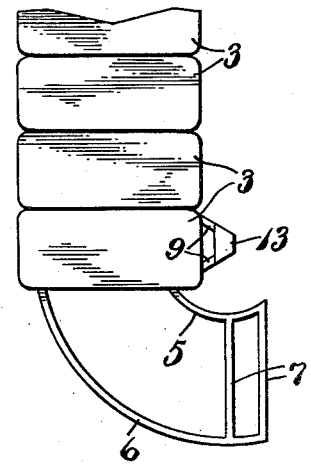

In the construction disclosed, two conveying means are fragmentarily shown (Fig. 1), one a roller conveyor 1 of a width so that the pallets may be moved lengthwise thereof with the pallets in end to end relation (Fig. 5), and the other a wider roller conveyor 2 on to which the pallets are delivered and located side by side (Fig. 4). The pallets 3 are of rectangular form of greater length than the width, so that the width of the roller conveyor at 2 is a width greater than the width of the pallets, and the width of the roller conveyor 1 corresponds substantially to the width of the pallets.

Figure 3:
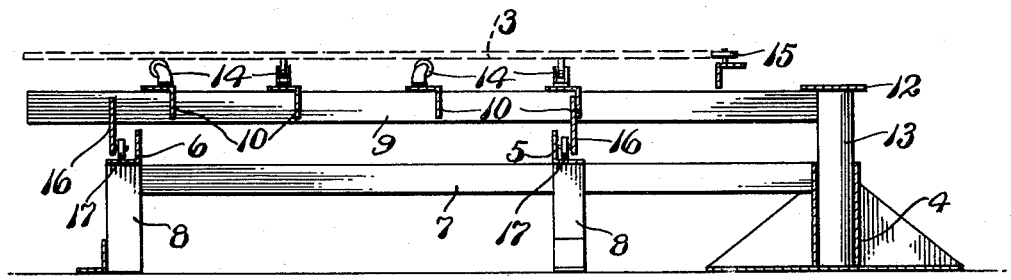
Fig. 3 is a longitudinal vertical section at right angles to the plane of Fig. 2 on the plane of line 3—3 of Fig. 1, looking in the direction indicated.

The change direction means between the delivery end of the conveyor 1 and the receiving end of the conveyor 2 includes a fixture 4, permanently secured to the floor of a factory having a suitable base and a vertical cylindrical socket best shown in Fig. 3.

Arc-shaped tracks 5 and 6 having a center of curvature coincident with the vertical axis of the socket 4, and spaced from each other, form a part of a carrying means, the tracks being secured to horizontal frame bars 7 radiating from the fixture 4, each having supporting legs 8 extending to the floor at the outer ends thereof and at any other positions in the frame such as one end of each of the tracks 6 (Fig. 1) for providing a rigid frame structure, the tracks 5 and 6 being located in a horizontal plane. Preferably the tracks are of an angle iron form in cross section, having horizontal and vertical legs, and the frame bars 7 and legs 8 may likewise be of common structural iron forms for greatest strength with a minimum of weight.

The pallet carriage includes a plurality of parallel horizontal bars 9, shown as three in number, which are rigidly connected together by a plurality of cross bars 10 as shown in Fig. 1. Such carriage bars 9 come together at one end, its outer bars converging, and are welded or otherwise permanently secured to a connecting plate 12. At such end of the carriage a vertical post 13 of cylindrical form is permanently secured and is inserted into the vertical socket of the fixture 4. Such carriage therefore may be swung about the axis of the post 13 from a position in alinement with the narrower roller conveyor 1, to a position where it is across the receiving end of the conveyor 2.

At the upper side of the carriage a large number of castors 14 are mounted, each of a swivel construction to turn about a vertical axis. Small rollers 15 are mounted at the outer side of the carriage when it is in alinement with the conveyor 1, and also partially across the carriage near its pivotal end, so that a pallet 3 when moved onto the carriage will roll over the castors 14 guided at its outer edge by the side rollers 15, and stopped when its end reaches the transverse rollers 15, which when the carriage has been moved from the position shown in Fig. 4 to that shown in Fig. 5, guide the pallet in its movement onto the conveyor 2.

At the underside of the carriage over the horizontal legs of the tracks 5 and 6 curved or arc-shaped plates 16 are permanently secured and extend downwardly therefrom, on which a plurality of small rollers 17 are mounted to turn about horizontal axes, the rollers resting upon the horizontal legs of the curved tracks 5 and 6.

When a pallet 3 has been moved from the conveyor 1 on to the carriage and is ready for a swinging movement of the carriage as has been described, it is desirable that the pallet be clamped against any accidental, aimless or other undesired movement during such movement. It is also desirable that there shall be no clamping interference with the pallet when it is moved on to the carriage, or when it is moved off therefrom. Without invention, a mounting bar 18 is connected with the outer side of the carriage, in the position shown in Fig. 1, and near the outer free end thereof, on which a vertical guide structure including a sleeve 19 and a rod 20 both vertically positioned are secured, and from the latter of which a plate extends over the upper end of the guide 19. A rod 21 passes freely through the guide sleeve 19 and at its upper end is bent into a substantially half circle, with the free end of which a clamping member 22 is fixed in a position to lie over the edge portion of a pallet 3 when moved thereunder on to the carriage. The rod 21 at its lower end is equipped with a roller 23 and between the lower end of the sleeve and the upper end of the fork which carries the roller a coiled compression spring 24 is mounted around the rod. Such spring normally moves the clamp in a downward direction to bring it against the upper side of a pallet underneath it.

On the track 26 at the receiving end, and toward but spaced from the delivery end, a cam member 25 is fixed, comprising an inclined section and a keeper or detent section. When the roller 23 comes to an inclined section and rides thereover, which it does when the carriage approaches its opposite positions of swinging movement, spring 24 is compressed and the clamp 22 lifted. The roller 23 passes over the highest point of the inclined section of a member 25, and is received in the keeper end thereof (Fig. 2). As soon as the carriage is moved from either of its extreme positions, the roller rides out of the keeper portion of the member 25 with which it is engaged, and down the inclined section thereof, so that the immediate clamp 22 is brought against the upper side of a pallet on the carriage and the clamp is pressed against the upper side of the pallet by the force of the spring 24.

The structure described is very useful and is of a practical, economically produced form. With it pallets in succession may be transferred from a conveyor line such as indicated at 1, where the pallets have been located end to end and manufactured articles on the pallets have had various steps of their manufacture to completion performed thereon, on to the carriage, and each pallet successively swung to a position for movement on to the second conveyor 2 where the pallets will be located side by side. By such conveyor 2 the pallets, with the articles carried thereby, may be moved through a drying oven or to any other step of procedure in handling the manufactured articles which may be wanted. In actual operation the carriage is automatically swung by an air cylinder from one position to another and back again, the performance of which is timed by the tripping of a control valve by a pallet being moved to a position which it is to occupy on the carriage, a second valve being tripped upon completion of the movement and which brings into operation a second cylinder which operates apparatus for moving the pallet off of the carriage on to the receiving conveyor 2. Such structure, not forming a part of the present invention is not disclosed. There is an economy of manufacture attained with an elimination of labor costs in the handling of the pallets and the finishing of manufactured goods, particularly in the field of furniture.

The invention is defined in the appended claims and is to be considered comprehensive of all forms of structure coming within their scope.

We claim:

1. Two pallet carrying conveyors spaced from each other at adjacent ends, one conveyor being of greater width than the other, track means of curved form located between adjacent ends of the conveyors, a carriage swingably mounted on said tracks to turn about a vertical axis between adjacent ends of the conveyor adapted to be swung from a position in which it is located at the end of the narrower conveyor and extends in a direction parallel to the length thereof, to a second position in which it has its length lying in a direction perpendicular to the length of the wider conveyor, said carriage having a width approximating the width of the narrower conveyor, and having a plurality of castors swivelly mounted thereon to turn about vertical axes extending above the upper side of the carriage on to which a pallet may be moved in the direction of its length from the first conveyor, and from which said pallet may be moved in the direction of its width on to the second conveyor.

2. Two pallet carrying conveyors spaced from each other at adjacent ends, one conveyor being of greater width than the other, track means of curved form located between adjacent ends of the conveyors, a carriage swingably mounted on said tracks to turn about a vertical axis between adjacent ends of the conveyor adapted to be swung from a position in which it is located at the end of the narrower conveyor and extends in a direction parallel to the length thereof, to a second position in which it has its length lying in a direction perpendicular to the length of the wider conveyor, and a plurality of spaced alined rollers mounted on said carriage to turn on vertical axes at and extending above the upper side of and at the outer side of the carriage when in its first position, against which the outer edge of a pallet moved from the first and narrower conveyor on to the carriage is adapted to bear, and additional rollers located transversely of and at the upper side of the carriage to turn about vertical axes, located adjacent the pivotal axis and alined transversely of the carriage, against which the end of a pallet engages when moved onto the carriage.

3. Two pallet carrying conveyors spaced from each other at adjacent ends, one conveyor being of greater width than the other, track means of curved form located between adjacent ends of the conveyors, a carriage swingably mounted on said tracks to turn about a vertical axis between adjacent ends of the conveyor adapted to be swung from a position in which it is located at the end of the narrower conveyor and extends in a direction parallel to the length thereof, to a second position in which it has its length lying in a direction perpendicular to the length of the wider conveyor, and a yielding clamping member mounted upon the carriage at the outer side thereof when in its first position, underneath which a pallet moved on to the carriage from the first and narrower conveyor passes, and means for operating said clamping means when the carriage approaches either extreme position of its movement to move said clamping means to inoperative position, and release said clamping means to clamp a pallet to the carriage between such positions.

4. A structure as defined in claim 3, said clamping means comprising a vertically located rod, a vertical guide through which the rod passes mounted on the carriage, said rod at its upper end being laterally turned and having a clamp at its free end adapted to be located above an edge portion of a pallet moved on to the carriage, spring means acting on the rod for normally tending to move it downwardly, and fixed inclined members mounted on said track means in positions for the lower end of the rod to engage therewith and ride up said inclined members to elevate the clamp against said spring means as the carriage approaches either extreme of its movement, and down which the lower end of the rod moves when the carriage is moving away from either extreme position.

5. In a structure as described, two elongated conveying means spaced from each other at adjacent ends, said conveying means being disposed in a substantially horizontal plane, one of said conveying means being wider than the other, curved tracks having a common center of curvature spaced from each other, having one end of each track closely adjacent one end of the wider conveying means, and the other end portion of said tracks located in front of the narrower conveyor, an elongated pallet receiving carriage, rollers mounted upon said carriage riding on the tracks, means for pivotally mounting an end of the carriage for swinging movement of the carriage from a position in front of and alined with the narrower conveying means to a position across the adjacent end of the second wider conveying means, said pallet being located lengthwise on the first conveying means and crosswise as to its length on the second conveying means, means for releasably clamping a pallet upon the carriage, spring means for normally moving said clamping means to clamping position, and spaced means on said track means for engaging with said clamping means to lift and unclamp the clamping means at either extreme position of movement of the carriage, and releasing it for clamping action between such extreme positions.

JACK H. B. HERTS.
JOHN E. McPHEE.

REFERENCES CITED

The following references are of record in the file of this patent:

UNITED STATES PATENTS

| Number | Name | Date |
|---|---|---|
| 1,741,616 | Crady | Dec. 31, 1929 |
| 1,808,134 | Gotthardt | June 2, 1931 |
| 1,967,761 | Von Reis | July 24, 1934 |
| 2,257,937 | Brunnhoelzl | Oct. 7, 1941 |